US012613663B2

(12) United States Patent
McDaniel et al.

(10) Patent No.: US 12,613,663 B2
(45) Date of Patent: Apr. 28, 2026

(54) VIRTUAL PRINTING DEVICE CONSUMABLE ITEM AUTHENTICATION

(71) Applicant: Hewlett-Packard Development Company, L.P., Spring, TX (US)

(72) Inventors: Gabriel Scott McDaniel, Boise, ID (US); Paul L. Jeran, Boise, ID (US); Jeffrey H. Luke, Boise, ID (US)

(73) Assignee: HEWLETT-PACKARD DEVELOPMENT COMPANY, LTD., Spring, TX (US)

( * ) Notice: Subject to any disclaimer, the term of this patent is extended or adjusted under 35 U.S.C. 154(b) by 197 days.

(21) Appl. No.: 18/568,786

(22) PCT Filed: Jun. 11, 2021

(86) PCT No.: PCT/US2021/037033
§ 371 (c)(1),
(2) Date: Dec. 8, 2023

(87) PCT Pub. No.: WO2022/260680
PCT Pub. Date: Dec. 15, 2022

(65) Prior Publication Data
US 2024/0272842 A1 Aug. 15, 2024

(51) Int. Cl.
*H04N 1/04* (2006.01)
*G06F 3/12* (2006.01)
*G06Q 30/018* (2023.01)

(52) U.S. Cl.
CPC .......... *G06F 3/1222* (2013.01); *G06F 3/1238* (2013.01); *G06Q 30/0185* (2013.01)

(58) Field of Classification Search
USPC ................................................. 358/1.14, 1.15
See application file for complete search history.

(56) References Cited

U.S. PATENT DOCUMENTS

| | | | |
|---|---|---|---|
| 8,973,949 B2 | 3/2015 | Lamboy | |
| 2002/0077979 A1 | 6/2002 | Nagata | |
| 2004/0049468 A1 | 3/2004 | Walmsley | |
| 2006/0065710 A1 | 3/2006 | Endo et al. | |

(Continued)

FOREIGN PATENT DOCUMENTS

| | | |
|---|---|---|
| JP | 2015-090531 A | 5/2015 |
| WO | 2020/022583 A1 | 1/2020 |

(Continued)

OTHER PUBLICATIONS

Anderson, et al., "Cryptographic Processors—A Survey," in Proceedings of the IEEE, vol. 94, No. 2, Feb. 2006, doi: 10.1109/JPROC.2005.862423 (Year: 2006), pp. 357-369.

*Primary Examiner* — Cheukfan Lee
(74) *Attorney, Agent, or Firm* — Michael Dryja

(57) ABSTRACT

A user device transmits to a computing device an authentication code for a virtual printing device consumable item. The computing device authenticates the virtual printing device consumable item using the authentication code. Upon successful authentication of the virtual printing device consumable item, the virtual printing device consumable item is associated with a printing device to permit the printing device to print in accordance with the virtual printing device consumable item. The printing device subsequently prints as permitted by the virtual printing device consumable item.

12 Claims, 8 Drawing Sheets

(56)                References Cited

U.S. PATENT DOCUMENTS

| | | |
|---|---|---|
| 2007/0055883 A1 | 3/2007 | Kruse |
| 2011/0211849 A1 | 9/2011 | Okamoto |
| 2012/0134686 A1 | 5/2012 | Jones et al. |
| 2014/0077928 A1 | 3/2014 | Markel et al. |
| 2015/0110504 A1 | 4/2015 | Lee et al. |
| 2015/0286453 A1 | 10/2015 | Thacker et al. |
| 2016/0027021 A1 | 1/2016 | Kerdemelidis |
| 2016/0082740 A1 | 3/2016 | Jeran |
| 2016/0131992 A1 | 5/2016 | Ignatchenko et al. |
| 2016/0266514 A1 | 9/2016 | Richards et al. |
| 2016/0342110 A1 | 11/2016 | Luke |
| 2017/0070642 A1 | 3/2017 | Miyamoto et al. |
| 2017/0123360 A1 | 5/2017 | Jeran et al. |
| 2017/0262721 A1* | 9/2017 | Richards ............ G03G 15/0863 |
| 2018/0072064 A1 | 3/2018 | Kiyohara |
| 2018/0178452 A1 | 6/2018 | Costabeber |
| 2020/0042929 A1 | 2/2020 | Yu |
| 2020/0130359 A1 | 4/2020 | Kiyohara |
| 2021/0295745 A1 | 9/2021 | Lev |
| 2024/0272842 A1* | 8/2024 | McDaniel ............ G06F 3/1285 |

FOREIGN PATENT DOCUMENTS

| | | | |
|---|---|---|---|
| WO | 2020/096643 A1 | 5/2020 | |
| WO | 2020/180343 A1 | 9/2020 | |

* cited by examiner

200

600

602

RECEIVE AUTHENTICATION CODE FOR VIRTUAL
PRINTING DEVICE CONSUMABLES ITEM FROM
USER DEVICE

604

AUTHENTICATE VIRTUAL PRINTING DEVICE
CONSUMABLE ITEM

606

UPON SUCCESSFUL AUTHENTICATION,
ASSOCIATE VIRTUAL PRINT DEVICE
CONSUMABLE ITEM WITH PRINTING DEVICE

VIRTUAL PRINTING DEVICE CONSUMABLE ITEM AUTHENTICATION

BACKGROUND

Printing devices can use a variety of different technologies to form images on media such as paper or to build three-dimensional (3D) objects. Such technologies include dry electrophotography (EP) and liquid EP (LEP) technologies, which may be considered as different types of laser and light-emitting diode (LED) printing technologies, as well as inkjet-printing technologies and three-dimensional (3D) printing technologies. Printing devices deposit print material, such as colorant like toner, ink (which can include other printing fluids or material as well), or 3D print material.

DETAILED DESCRIPTION

Figure 1:
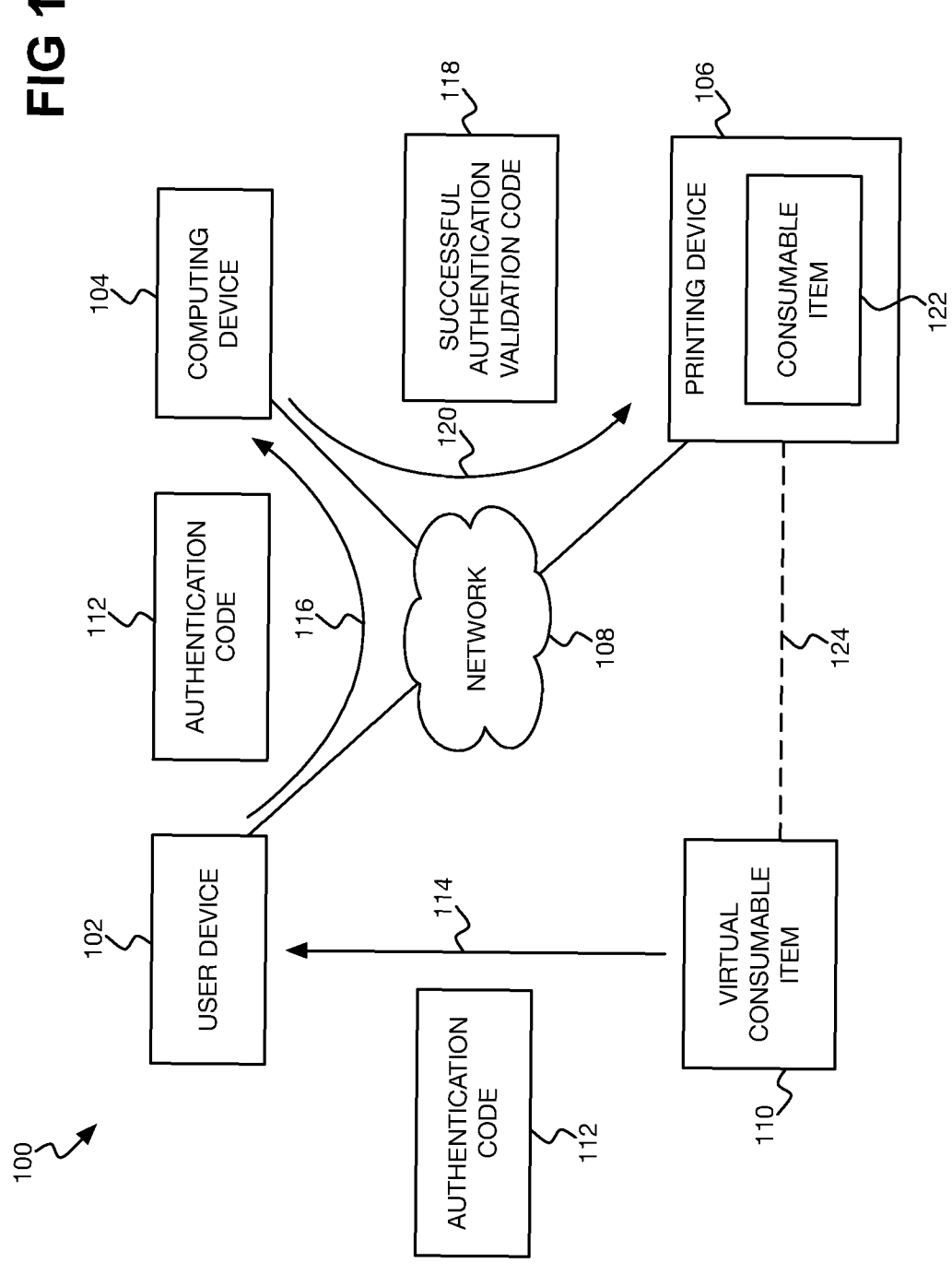
FIG. 1 is a diagram of an example system in which a virtual printing device consumable item is authenticated and associated with a printing device in an online manner.

As noted in the background, printing devices deposit print material to form images on media or, in the case of three-dimensional (3D) printing devices, to additively build (3D) objects. A printing device can include a cartridge of print material that the device uses for printing. As the printing device prints print jobs, print material is consumed from the cartridge. When the cartridge is empty or is running low on print material, the cartridge may be replaced with a replacement cartridge that has a fresh (e.g., full) supply of print material. A cartridge is thus one type of a consumable item that a printing device uses for printing.

In the case of a laser printing device, the cartridge may be a toner cartridge that includes a supply of toner as well as other components that the printing device uses for printing, such as a developer roller. In the case of an inkjet printing device, the cartridge may similarly be an inkjet cartridge that includes a supply of ink as well as other components that the printing device uses for printing, such as an inkjet printhead. In many cases, the developer roller, inkjet printhead, and other components besides the actual print material (viz., the toner, ink, etc.) contained within the cartridge remain in good working condition even when the supply of print material becomes depleted.

Therefore, some types of printing devices use consumable items that include just supplies of print material. For example, a laser-printing device may use a toner cartridge that includes just a supply of toner and not a developer roller and/or other components that still have useful life even when the toner supply is depleted. Similarly, an inkjet-printing device may use an inkjet cartridge that includes just one or multiple supplies of ink and not one or multiple inkjet printheads that still have useful life even when the ink supplies are depleted. The developer roller, inkjet printheads, etc., may be part of other end user-replaceable consumable items within the printing devices, or may not be meant to replaced by end users.

Printing device consumable items that include just supplies of print material can be manufactured and sold at lower cost than consumable items that also include other components like developers roller or inkjet printheads. In general, however, a printing device consumable item can include any item that is replaceable within a printing device, particular by an end user, and that is consumed or depleted during usage of the printing device for printing. Other examples of printing device consumable items therefore include fuser assemblies, developer assemblies, transfer belts, and so on, in the case of a laser-printing device, and fluid-ejection (e.g., inkjet) printheads in the case of a fluid-ejection (e.g., inkjet) device that employs separately replaceable printheads and fluid (e.g., ink) supplies.

To ensure that printing devices print with the best image and print quality possible, manufacturers advise users that they should use authorized consumable items within the devices. An authorized consumable item can be one that is manufactured by or for the manufacturer of a printing device and acquired from a trusted party. A user purchasing such a consumable item can therefore be certain that usage of the item within his or her printing device will result in the best performance possible, and will not damage the device.

A consumable item that is manufactured by or for the manufacturer is an authentic consumable item. Acquisition of the consumable item from a trusted party ensures that the item has not been impermissibly modified or reused, such as by being refilled with print material by an unauthorized party. That is, an otherwise authentic consumable item that is impermissibly refilled with print material can result in degraded image and print quality, and potentially damage the printing device, when reused in this manner. Acquisition from a trusted party further ensures that a counterfeit consumable item will not be passed off as authentic.

To guard against unauthorized consumable items from being unknowingly used in printing devices, authentic consumable items may include authentication devices or other security features of varying sophistication by which the devices can verify that the items are indeed authentic. In certain cases, a printing device may prevent a consumable item that fails authentication from being used, for instance, to prevent possible damage to the device, or for other reasons. In other certain cases, instead of preventing use of the consumables, the printing device may change operating parameters to a different mode to reduce the likelihood of device damage.

Such authentication devices can be in the form of security-hardened integrated circuits (ICs) that contain information which can be verified by the printing devices, potentially in communication with a computing device operated by the manufacturer. Other authentication devices can be in the form of security tags, such as holograms, quality response (QR) codes, radio frequency identifier (RFID) and near-field communication (NFC) tags, and so on, including on the consumable items themselves. In this case, a printing device may verify that the consumable item is authentic by reading, scanning, or communicating with the security tag.

Inclusion of an authentication device within a printing device consumable item that a printing device itself has to verify as authentic can raise manufacturing costs in two ways, however. First, the printing device itself has to have the appropriate hardware in order to communicate with, read, or scan the authentication device of a consumable item inserted into the device. The inclusion of this hardware within a printing device can raise the manufacturing costs of the printing device. Second, the manufacturing costs of the consumable item itself may increase to accommodate the inclusion of the authentication device within the item, particularly in the case of a security-hardened IC. Manufacturers may be particularly sensitive to increased manufacturing costs for consumable items.

Techniques described herein ameliorate these issues via a virtual printing device consumable item. The virtual consumable item can be authenticated without involvement of a printing device. Once the virtual consumable item has been authenticated, the virtual consumable item can be associated with a printing device to permit the printing device to print using an actual consumable item. Authentication of the virtual consumable item thus provides for disintermediated authentication of the actual consumable item that the printing device uses to print: the latter consumable item is not authenticated per se, but a printing device is permitted to print using the consumable item so long as an authenticated virtual consumable item has been associated with the printing device.

The virtual consumable item may be in the form of a license for a specified number of pages. That is, the virtual consumable item may have a virtual capacity of a specified number of pages. Once the virtual consumable item has been authenticated and associated with a printing device, the printing device can then print the specified number of pages accorded by the license, using any actual consumable item. The virtual consumable item may have an authentication code that is printed on the packaging of an actual consumable item or on the actual item itself (i.e., the housing of the item). Although authentication of the virtual consumable item is expected to result in usage of this actual consumable item within the printing device, in actuality the printing device can print in accordance with (i.e., as provided or permitted by) the virtual consumable item using any actual consumable item, and not just the particular actual consumable item in question.

Usage of a virtual consumable item in this manner can reduce manufacturing costs of the printing device and the consumable item itself. Because the printing device is not involved in authentication of the virtual consumable item, the device does not have to include any hardware or other components as the printing device would if it had to verify an actual consumable item, reducing manufacturing costs. While the authentication code for the virtual consumable item may be printed on the actual consumable item, manufacturing costs of the actual consumable item may nevertheless be reduced because a more expensive, security-hardened IC does not have to be included within the item, for instance.

The techniques described herein therefore provide an improvement in the technology of printing device consumable item authentication. Rather than direct authentication of a printing device consumable item, the techniques provide for disintermediated such authentication, via direct authentication of a virtual printing device consumable item. Once authenticated, the virtual consumable item can be associated with a printing device, to permit the printing device to use any actual consumable item for printing in accordance with the virtual item, such as a license for a specified number of pages of what is in effect a virtual capacity of the virtual consumable item.

FIG. 1 shows an example system 100 by which virtual printing device consumable item authentication and printing device association occurs in an online manner. In the example, the system 100 includes a user device 102, a computing device 104, and a printing device 106 that are each communicatively connected to a network 108. Authentication of a virtual consumable item 110 occurs in an online manner in the example in that the printing device 106 receives authorization to print in accordance with the virtual consumable item 110 from the computing device 104. That is, the printing device 106 is online and connected to the network 108 so that the printing device 106 can communicate with the computing device 104.

The user device 102 may be a computing device, such as a mobile computing device like a smartphone or a tablet computing device, or another type of computing device, such as a desktop, laptop, or notebook computer, of an end user of the printing device 106. The printing device 106 may be a standalone printer or an all-in-one (AIO) printing device combining other functionality in addition to printing functionality, such as scanning, copying, and faxing functionality, for instance. The printing device 106 may be an inkjet printing device, a laser printing device, or another type of printing device. The computing device 104 can be a server computing device, and is operated by or on behalf of the manufacturer of the printing device 106.

The network 108 may be or include the Internet, an intranet, an extranet, a wide-area network, a local-area network, a wireless network, a wired network, and so on. In example, the printing device 106 is communicatively connected to the computing device 104 over the same network 108 as that over which the user device 102 is communicatively connected to the computing device 104. However, in another implementation, the printing device 106 may be communicatively connected to the computing device 104 over a different network 108 than that over which the user device 102 is communicatively connected to the computing device 104.

In basic operation of the system 100, the user device 102 inputs an authentication code 112 for the virtual consumable item 110, per arrow 114. The user device 102 transmits the authentication code 112 over the network 108 to the computing device 104, per arrow 116. The computing device 104 authenticates the virtual consumable item 110 using the authentication code 112. Upon authentication of the virtual consumable item 110, the computing device 104 transmits a successful authentication validation code 118 over the network 108 to the printing device 106, per arrow 120.

Upon receipt of the successful authentication validation code 118, the printing device 106 is permitted to print, using an actual consumable item 122, in accordance with the virtual consumable item 110. That is, the printing device 106 subsequently prints using the consumable item 122 as permitted by the virtual consumable item 110. The virtual consumable item 110 is thus associated with the printing device 106 upon authentication of the virtual item 110, per dotted line 124, permitting the printing device 106 to print in accordance with the virtual consumable item 110.

Figure 2:
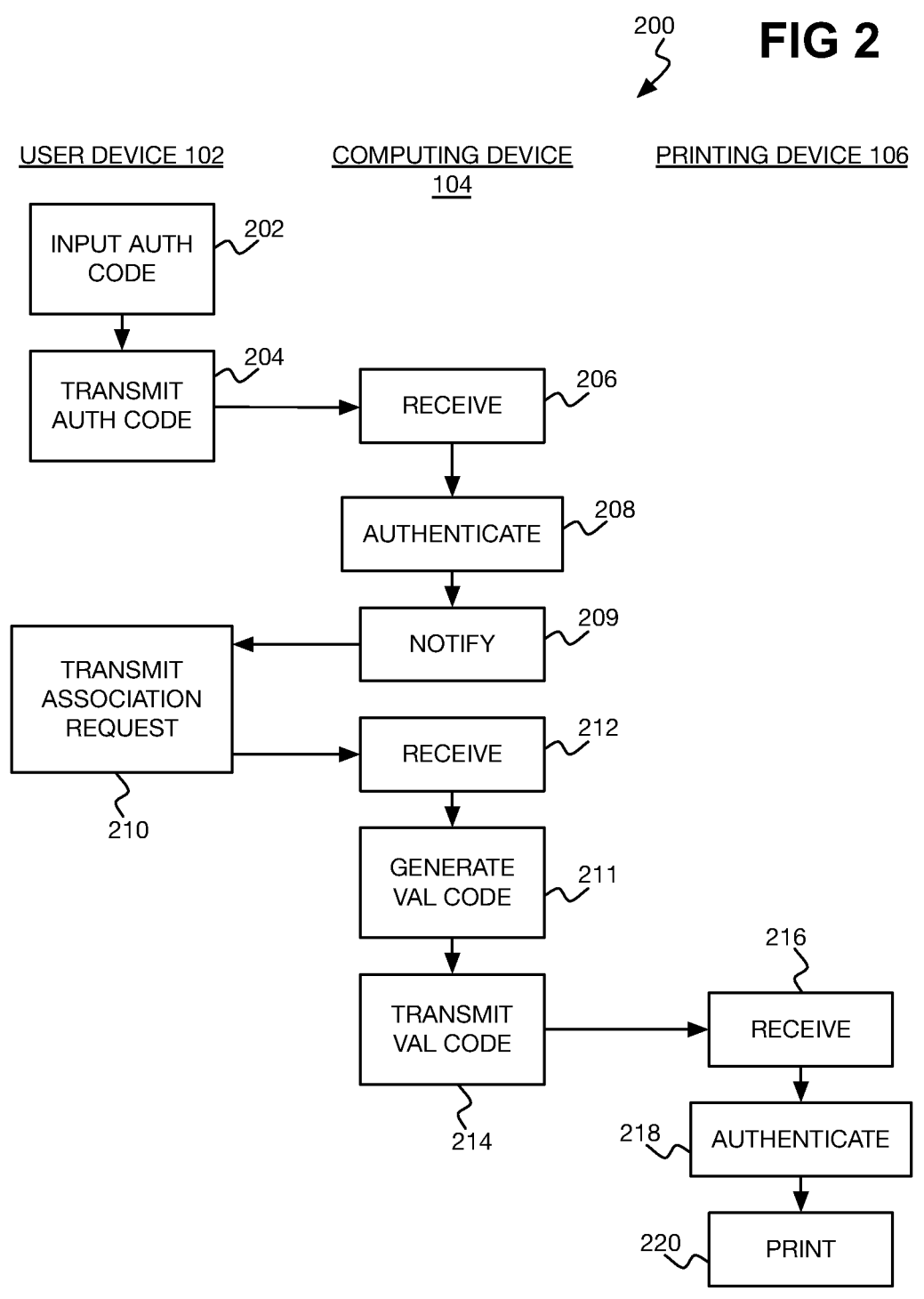
FIG. 2 is a diagram of an example process for authenticating and associating a virtual printing device consumable item with a printing device in an online manner.

FIG. 2 shows an example process 200 by which authentication of the virtual consumable item 110 and association of the virtual item 110 with the printing device 106 occurs in an online manner. The left parts of the process 200 are performed by the user device 102, the middle parts are performed by the computing device 104, and the right parts are performed by the printing device 106. The process 200 may be implemented as program code stored on a non-transitory computer-readable data storage medium and executed by a processor of a respective device. As one example, the middle parts of the process 200 may be implemented as program code that is executed by a processor of the computing device 104.

The user device 102 inputs an authentication code 112 for the virtual consumable item 110 (202). The authentication code 112 may be a unique identifier assigned to the virtual consumable item 110 and encrypted by a cryptographic key available to the computing device 104 but not to the user device 102 or the printing device 106. Therefore, the computing device 104 can decrypt the unique identifier using the cryptographic key. The cryptographic key in this example provides for symmetric encryption, in that the same key is used to both encrypt and decrypt the unique identifier. The cryptographic key is securely maintained by the manufacturer of the printing device 106 operating the computing device 104 (or for which the computing device 104 is being operated), or is securely maintained on behalf of the manufacturer.

The user device 102 may input the authentication code 112 in a variety of different manners. The authentication code 112 may be in the form of a graphical code, such as a QR code, printed on an actual consumable item that the printing device 106 can use to print, such as the consumable item 122, or on the packaging of such an actual consumable item. The user device 102 may therefore be able to optically scan the authentication code 112, such as by capturing an image of the authentication code 112 and decoding the code 112 from the captured image. The authentication code 112 may as another example be in the form of a series of characters that a user of the user device 102 manually enters at the user device 102. Furthermore, the authentication code 112 may be provided as a service apart from the consumable item 122, by the manufacturer of the consumable item 122 or by a different party or entity.

The user device 102 transmits the authorization code 112 for the virtual consumable item 110 over the network 108 to the computing device 104 (204), which thus receives the authentication code 112 over the network 108 from the user device 102 (206). The computing device 104 authenticates the virtual consumable item 110 using the received authentication code 112 (208). If the authentication code 112 has been symmetrically encrypted with a cryptographic key as noted above, the computing device 104 may first decrypt the authentication code 112 using the same cryptographic key.

The computing device 104 may authenticate the virtual consumable item 110 using the received authentication code 112 in a variety of different manners. For example, the computing device 104 may verify that the authentication code 112 is a legitimate authentication code. The authentication code 112 may be generated in a manner known just to the manufacturer of the printing device 106, for instance, such that if the authentication code 112 is not in the form of a legitimate such code, authentication of the authentication code 112 will fail. The authentication code 112 may be looked up against a list of authentication codes generated by or for the manufacturer, such that authentication fails if the code 112 is not present within this list.

The computing device 104 may also verify that, if its authentication code 112 is legitimate, the virtual consumable item 110 has not been previously associated with any printing device, such as the printing device 106 or another printing device. In this respect, a virtual consumable item 110 can be used just once. Once the virtual consumable item

110 has been associated with a printing device to permit that the printing device to print in accordance with the virtual item 110, the item 110 cannot be associated with a different printing device in this case. That is, even if the authentication code 112 for the virtual consumable item 110 is legitimate, if the virtual item 110 was previously associated with a printing device, the current authentication of virtual consumable item 110 will fail.

Assuming successful authentication of the virtual consumable item 110 on the basis of its authentication code 112, the computing device 104 may notify the user device 102 of such successful authentication over the network 108 (209). The user device 102 may then transmit over the network 108 a request to associate the authenticated virtual consumable item 110 with the printing device 106 (210). The computing device 104 thus receives the association request from the user device 102 over the network 108 (212). In another implementation, the computing device 104 may transmit the request to associate the virtual consumable item 110 with the printing device 106 at the same time that the device 104 transmits the authentication code 112 for the virtual item 110 to the computing device 104 for authentication.

The association request may include an identifier of the printing device 106, such as a serial number. The computing device 104 generates a successful authentication validation code 118 that permits the printing device 106 to print in accordance with the virtual printing device consumable item 110 (211). The validation code 118 may be digitally signed by a private cryptographic key of the manufacturer of the printing device 106 and that is available to the computing device 104 but not to the user device 104 or to the printing device 106. The private cryptographic key is securely maintained by the manufacturer of the printing device 106 operating the computing device 104 (or for which the computing device 104 is being operated), or is securely maintained on behalf of the manufacturer.

The successful authentication validation code 118 can include the identifier of the printing device 106 as provided with the association request. That is, the identifier of the printing device 106 may be encoded within the validation code 118. The validation code 118 can also include the virtual consumable item 110 itself. For example, if the virtual consumable item 110 has a virtual capacity of a specified number of pages, the specified number of pages may be encoded within the validation code 118. Therefore, the printing device 106 is permitted to print the specified number of pages of the virtual consumable item 110 as encoded within the validation code 118.

The computing device 104 transmits the successful authentication validation code 118 in the online process 200 to the printing device 106 over the network 108 (214). The printing device 106 thus receives the validation code 118 from the computing device 104 over the network 108 in the online process 200 (216). That is, the process 200 is an online process in that the printing device 106 is communicatively connected to the computing device 104 over the network 108, and therefore receives the validation code 118 from the computing device 104 directly. The printing device 106 can authenticate the validation code 118 (218). For example, the printing device 106 can verify that printing device identifier of the validation code 118 matches the unique identifier of the printing device 106 itself.

If the validation code 118 has been digitally signed by a private cryptographic key of the manufacturer, the printing device 106 can authenticate the validation code 118 using a corresponding public cryptographic key. Unlike the private cryptographic key, the public cryptographic key of the manufacturer is not securely maintained by or on behalf of the manufacturer, and is available to other devices, including the printing device 106 and the user device 102, and not just the computing device 106. Therefore, authentication of the validation code 118 in this respect relies upon asymmetric encryption as provided by a private key-public key pair.

The printing device 106 can then print in accordance with the virtual consumable item 110 encoded within the successful authentication validation code 118 (220). For example, if the virtual consumable item 110 is in the form of a license for a virtual capacity of a specified number of pages, the printing device 106 can subsequently print the specified number of pages. The printing device 106 is permitted to print in accordance with the virtual consumable item 110 in this respect using any consumable item, such as the consumable item 122 on which (or on the packaging of which) the authentication code 112 may have been printed.

The virtual consumable item 110 may also provide other functionality, in addition to or instead of printing a specified number of pages. For example, the virtual consumable item 110 may provide functionality such as printing in both color and black and white, as opposed to printing in just black and white, with or without restricting the number of pages that can be printed using the consumable item 122. The virtual consumable item 110 may permit the printing device 106 to print in both duplex and simplex, as opposed to just in simplex, with or without restricting the number of pages that can be printed using the consumable item 122.

In general, then, the printing device 106 can print in accordance with the virtual consumable item 110 in that the virtual consumable item 110 can provide features, services, and/or functionality to be employed by the printing device 106. In this respect, then, the virtual consumable item 110 can permit additional features, services, and/or functionality to be used by the printing device 106 when the virtual item 110 has been successfully authenticated. If the virtual consumable item 110 is not successfully authenticated, the virtual item 110 may not restrict usage of the consumable item 122 by the printing device 106 to print in such a way that does not employ such additional features, services, and/or functionality.

That is, while it may be expected that the printing device 106 will print in accordance with the virtual consumable item 110 using the associated actual consumable item 122, the device 106 can in actuality print in accordance with the virtual item 110 using any actual consumable item, and not just the consumable item 122. Authentication of the virtual consumable item 110 thus provides for disintermediated authentication of the actual consumable item 122 itself. From the perspective of the user, authentication of the consumable item 122 may have occurred, but in actuality authentication of a virtual consumable item 110 is what occurred.

For example, the specified number of pages of the virtual consumable item 110 can correspond to the capacity of the consumable item 122. That is, the virtual consumable item 110 may specify a number of pages that can be printed that corresponds to the expected number of pages that the printing device 106 can print using print material of the consumable item 122. In another implementation, however, the specified number of pages of the virtual consumable item 110 may be independent of the number of pages that can be printed using the consumable item 122.

The printing device 106 is thus permitted to print in accordance with the virtual consumable item 110 as result of association of the virtual item 110 with the printing device 106. The association process of the virtual consumable item

110 with the printing device 106 includes transmitting the association request by the user device 102 through receipt and authentication of the successful authentication validation code 118 by the printing device 106. Therefore, the user device 102 requests the association, the computing device 104 generates the validation code 118 that actually associates the virtual consumable item 110 with the printing device 106, and the printing device 106 can subsequently print in accordance with the virtual item 110 upon such association.

Figure 3:
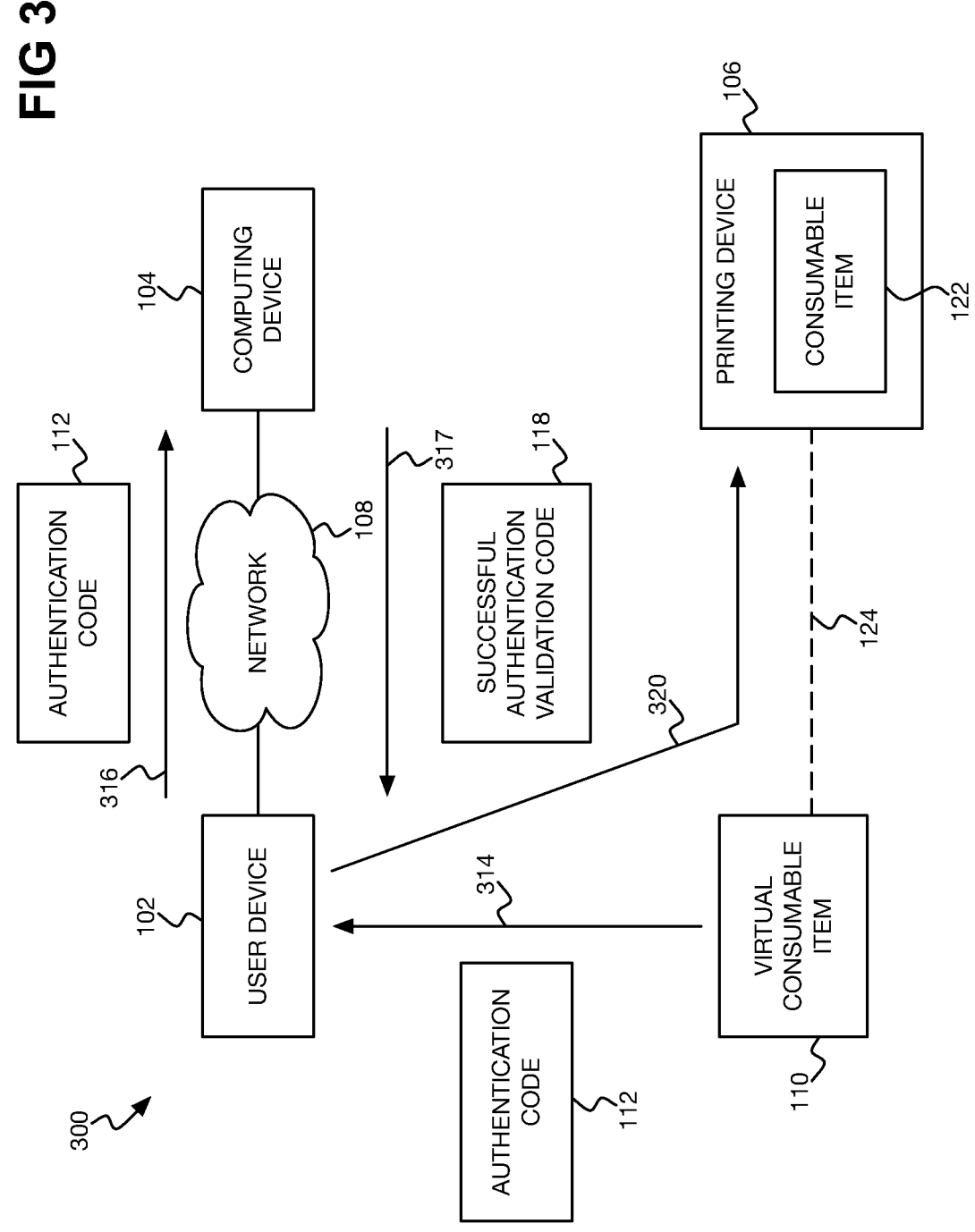
FIG. 3 is a diagram of an example system in which a virtual printing device consumable item is authenticated and associated with a printing device in an offline manner.

FIG. 3 shows an example system 300 by which virtual printing device consumable item authentication and printing device association occurs in an offline manner. In the example, the system 100 again includes the user device 102 and the computing device 104 that are each communicatively connected to the network 108. The system 100 also again includes the printing device 106, but the printing device 106 is not communicatively connected to the network 108, or at least does not communicate with the computing device 104 over the network 108. Authentication of the virtual consumable item 110 occurs in an offline manner in the example in that the printing device 106 receives authorization to print in accordance with the virtual consumable item 110 from the user device 102. That is, the printing device 106 is offline and disconnected from the network 108 or otherwise cannot communicate directly with the computing device 104.

In basic operation of the system 300, the user device 102 again inputs an authentication code 112 for the virtual consumable item 110, per arrow 314. The user device 102 as before transmits the authentication code 112 over the network 108 to the computing device 104, per arrow 316. The computing device 104 again authenticates the virtual consumable item 110 using the authentication code 112. However, upon authentication of the virtual consumable item 110, the computing device 104 transmits a successful authentication validation code 118 over the network 108 to the user device 102, per arrow 317.

The user device 102 in turn provides the successful authentication validation code 118 to the printing device 106, per arrow 320. For example, the user device 102 and the printing device 106 may be communicatively connected directly, such as via near-field communication (NFC), Bluetooth, Wi-Fi Direct, or in another manner that may not rely on a separate centralized (e.g., non-peer-to-peer) network, like the network 108. In the case of Bluetooth or Wi-Fi Direct, for instance, a peer-to-peer network may be temporarily created by the printing device 106 for direct communication between the printing device 106 and the user device 102. Once the validation code 118 has been provided to the printing device 106, the peer-to-peer network may be terminated.

Upon receipt of the successful authentication validation code 118, the printing device 106 is permitted to print as before, using an actual consumable item 122, in accordance with the virtual consumable item 110. That is, the printing device 106 subsequently prints using the consumable item 122 as permitted by the virtual consumable item 110. The virtual consumable item 110 is therefore associated with the printing device 106 upon authentication of the virtual item 110, per dotted line 124, permitting the printing device 106 to print in accordance with the virtual consumable item 110.

Figure 4:
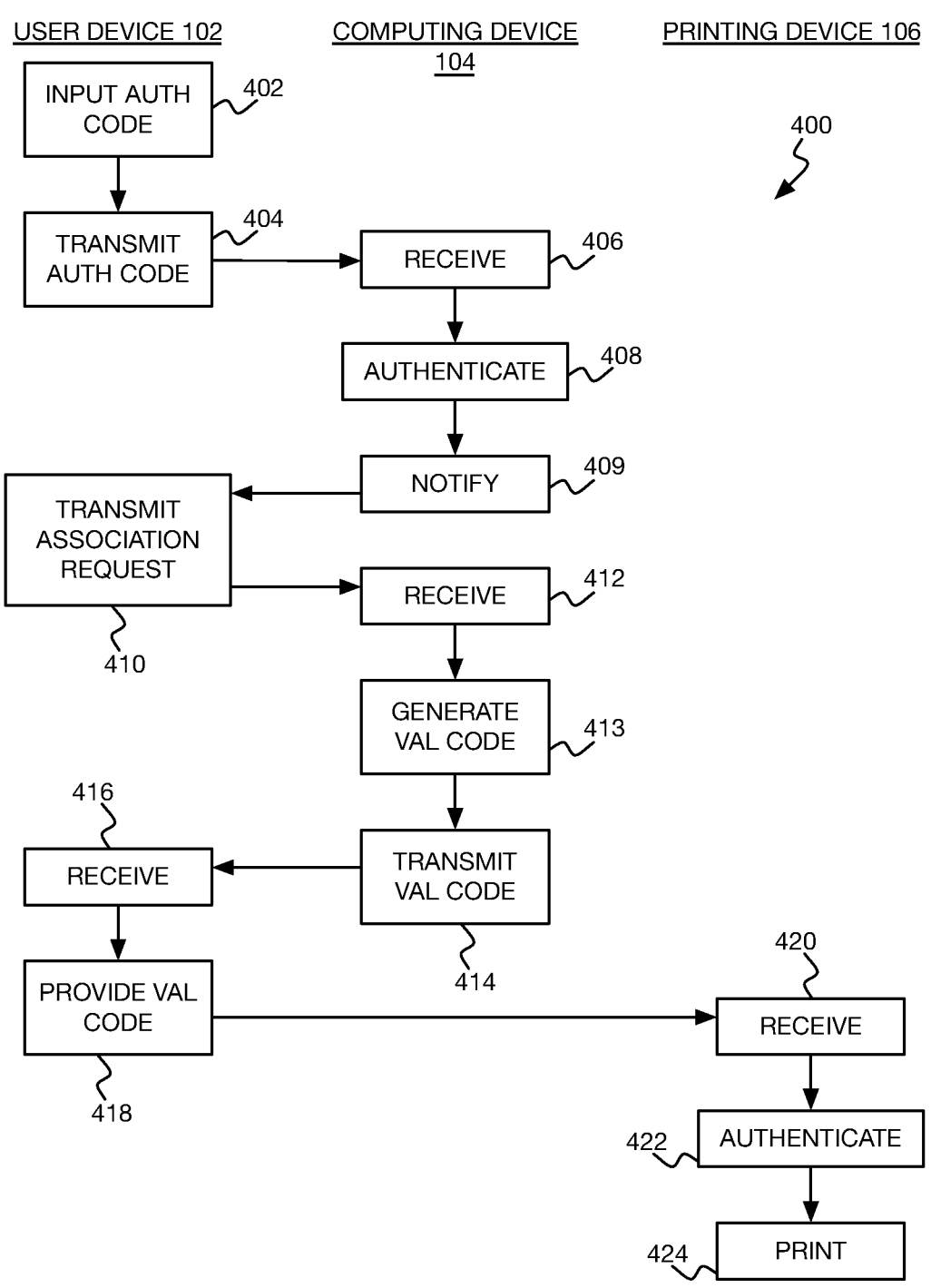
FIG. 4 is a diagram of an example process for authenticating and associating a virtual printing device consumable item with a printing device in an offline manner.

FIG. 4 shows an example process 400 by which authentication of the virtual consumable item 110 and association of the virtual item 110 with the printing device 106 occurs in an offline manner. The left parts of the process 400 are performed by the user device 104, the middle parts are performed by the computing device 104, and the right parts are performed by the printing device 106. As with the process 200, the process 400 may be implemented as program code stored on a non-transitory computer readable data storage medium and executable by a processor of a respective device.

The user device 102 inputs an authentication code 112 for the virtual consumable item 110 (402), as in part 202 of the process 200. As in part 204 of the process 200, the user device 102 transmits the authentication code 112 for the virtual consumable item 110 over the network 108 to the computing device 104 (404), which thus receives the authentication code 112 over the network 108 from the user device 102 (406). The computing device 104 authenticates the virtual consumable item 110 using the received authentication code 112 (408), as in part 208 of the process 200.

Upon successful authentication of the virtual consumable item 110 based on the authentication code 112, the computing device 104 may notify the user device 102 of such successful authentication over the network 108 (409), as in part 209 of the process 200. As in part 210 of the process 200, the user device 102 may then transmit over the network 108 a request to associate the authenticated virtual consumable item 110 with the printing device 106 (410). The computing device 104 thus receives the association request form the user device 102 over the network 108 (412).

The computing device 104 generates a successful authentication validation code 118 that permits the printing device 106 to print in accordance with the virtual printing device consumable item 110 (413), as in part 211 of the process 200. In the offline process 400, however, the computing device 104 transmits the validation code 118 over the network 108 to the user device 102 (414), which thus receives the validation code 118 (416). In the offline process 400, the computing device 104 provides the validation code 118 directly to the printing device 106 (418). The process 400 is therefore an offline process in that the printing device 106 is not communicatively connected to the computing device 104 directly, and therefore does not receive the validation code 118 from the computing device 104 directly.

The printing device 106 thus receives the successful authentication validation code 118 as provided directly by the user device 102 (420). The printing device 106 can then authentication the validation code 118 (422), as in part 218 of the process 200. Upon successful authentication of the validation code 118, the printing device 106 can print in accordance with the virtual consumable item 110 (424), as in part 220 of the process 200.

The printing device 106 is therefore permitted to print in accordance with the virtual consumable item 110 as a result of association of the virtual item 110 with the printing device 106. The association process of the virtual consumable item 110 with the printing device 106 includes transmitting the association request by the user device 102 through receipt and authentication of the successful authentication validation code by the printing device 106. The user device 102 request the association, the computing device 104 generates the validation code 118 that actually associates the virtual consumable item 110 with the printing device 106, and the printing device 106 can subsequently print in accordance with the virtual item 110 upon such association.

Figure 5:
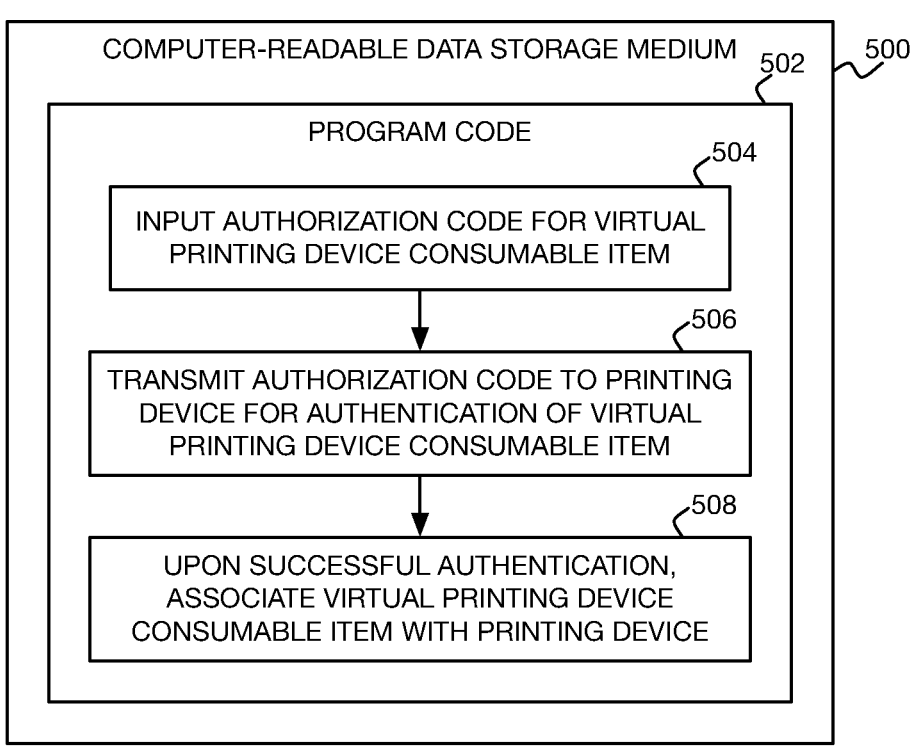
FIG. 5 is a diagram of an example non-transitory computer program-readable data storage medium.

FIG. 5 shows an example computer-readable data storage medium 500 storing program code 502 executable by the user device 102 for performing processing. The processing includes inputting an authentication code 112 for a virtual printing device consumable item 110 (504), and transmitting the authentication code 112 to a computing device 104 for authentication of the virtual consumable item 110 (506). The processing includes, upon successful authentication of the virtual consumable item 110, associating the virtual item 110 with a printing device 106 to permit the printing device 106 to print in accordance with the virtual consumable item 110 (508). The association may occur in an online or offline manner. The printing device 106 can then subsequently print as permitted by the virtual printing device consumable item 110.

Figure 6:
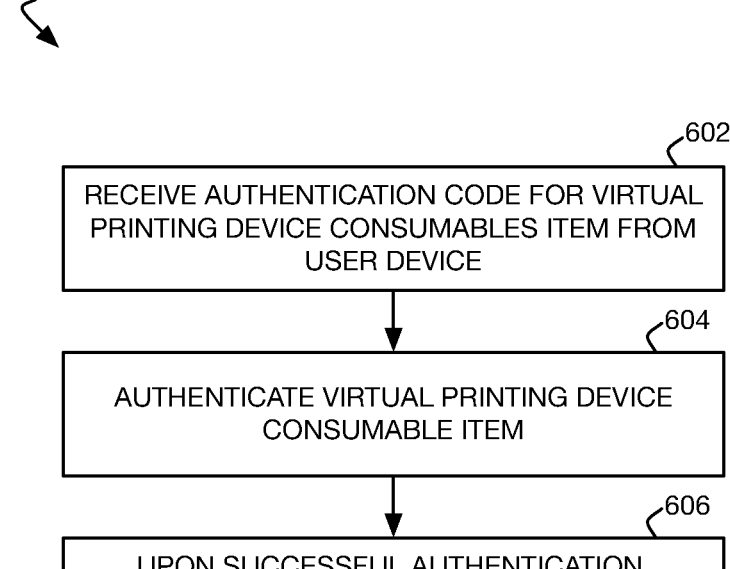
FIG. 6 is a flowchart of an example method.

FIG. 6 shows an example method 600 for performance by the computing device 104. The method 600 may be implemented as program code stored on a non-transitory computer-readable data storage medium and executable by the computing device 104. The method 600 includes receiving, from a user device 102, an authentication code 112 for a virtual printing device consumable item 110 (602), and authenticating the virtual consumable item 110 using the authentication code 112 (604). The method 600 includes, upon successful authentication of the virtual consumable item 110, associating the virtual item 110 with a printing device 106 to permit the printing device 106 to print in accordance with the virtual consumable item 110 (606). The association may occur in an online or offline manner. The printing device 106 can then subsequently print as permitted by the virtual printing device consumable item 110.

Figure 7:
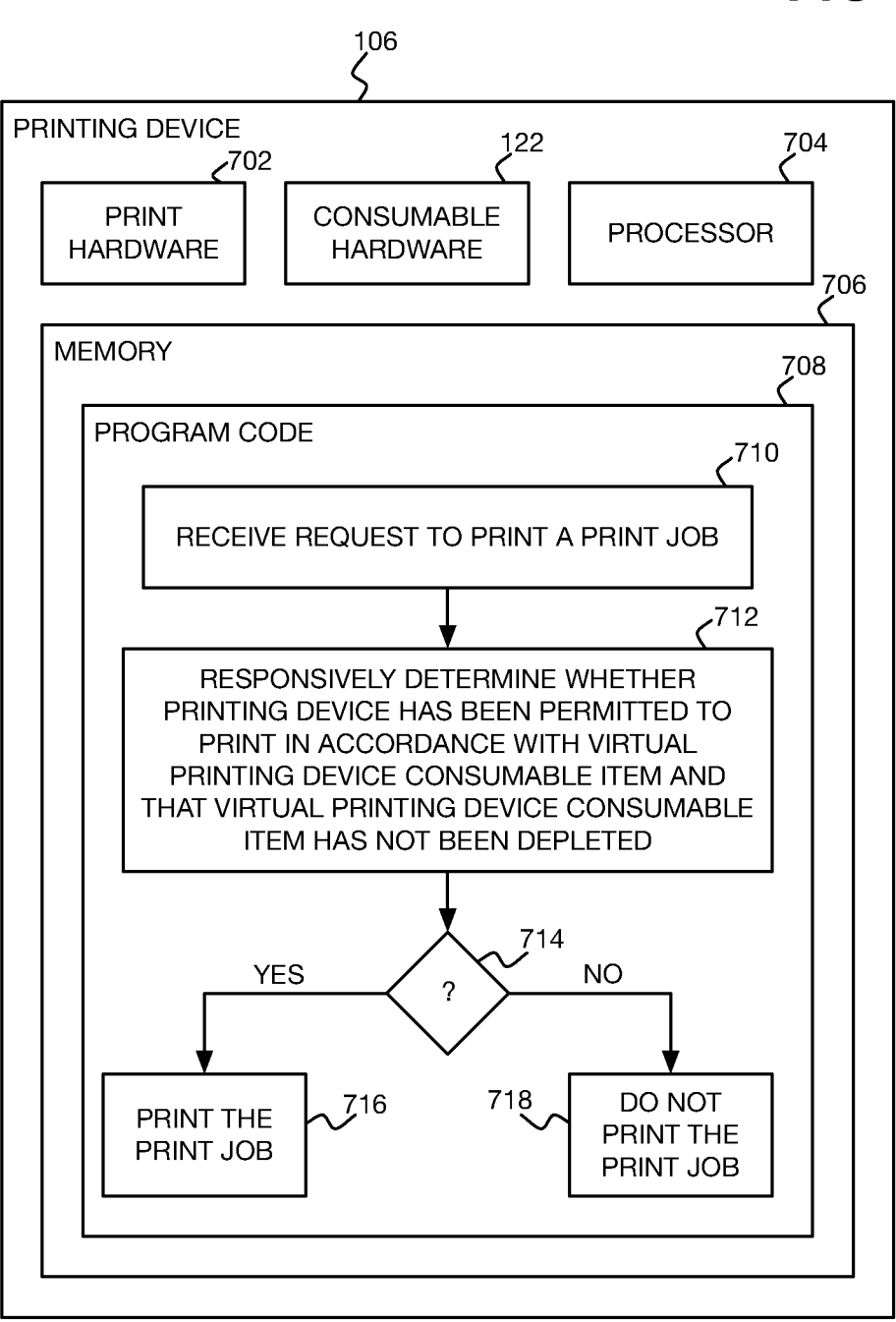
FIG. 7 is a diagram of an example printing device.

FIG. 7 shows an example printing device 106. The printing device 106 includes print hardware 702 to print using an actual consumable item 122. The print hardware 702 may be or include mechanical and electrical components and circuitry by which print material is output, such as onto print media like paper, to form images, for instance. The print hardware 702 may include laser-printing hardware, inkjet-printing hardware, or another type of print hardware. The printing device 106 also includes a processor 704 and a memory 706 storing program code 708 executable by the processor 704 to perform processing.

The processing includes, responsive to receiving a request to print a print job (710), determining whether the printing device 106 has been permitted to print in accordance with a virtual printing device consumable item 110 and that the virtual consumable item 110 has not been depleted (712). For example, the virtual consumable item 110 may have a virtual capacity of a specified number of pages. As the printing device 106 prints pages of print jobs, the device 106 decrements the remaining pages left in the virtual consumable item 110. Once there are no remaining pages left in the virtual item 110, the printing device 106 does not print, even though the consumable item 122 may have sufficient print material, for example, to still print. The remaining pages that can still be printed using the consumable item 122 thus does not control whether the printing device 106 is still able to print in accordance with the virtual consumable item 110.

The processing includes, responsive to determining that the printing device 106 has been permitted to print in accordance with the virtual consumable item 110 and that the virtual item 110 has not been depleted (714), printing the print job using the consumable item 122 (716). Such printing may assume, for example, that there is sufficient print material within the consumable item 122 to print the pages of the print job. Further, as the pages of the print job are printed, the remaining pages of the virtual capacity of the virtual consumable item 110 are accordingly decremented.

By comparison, responsive to determining that the printing device 106 has not been permitted to print in accordance with the virtual consumable item 110 and/or that the virtual item 110 has been depleted (714), the processing includes not printing the print job using the consumable item 122 (718). This is the case even if there is sufficient print material, for example, in the consumable item 122 to print the print job. In this respect, too, the consumable item 122 is disintermediated from the virtual consumable item 110.

Figure 8:
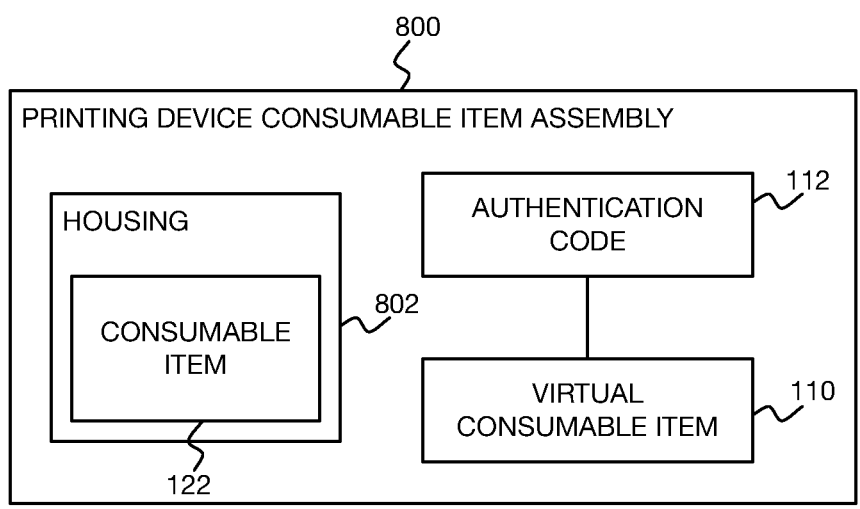
FIG. 8 is a diagram of an example printing device consumable item assembly.

FIG. 8 shows an example printing device consumable item assembly 800. The assembly 800 includes a housing 802, which may be in the form of a cartridge, containing a consumable item 122 that a printing device 106 uses to print. The assembly 108 further includes an authentication code 112 for a virtual printing device consumable item 110. Successful authentication of the virtual consumable item 110 permits the printing device 110 to print using any consumable item—including the consumable item 122 contained in the housing 802 as well as a different consumable item 122—in accordance with the virtual item 110.

Techniques have been described for a virtual printing device consumable item that the authentication of which provides for disintermediated authentication of an actual consumable item that a printing device uses to print. Usage of a virtual consumable item in this way means that the printing device does not have to read any security device or other feature on the actual consumable item, reducing manufacturing cost of the printing device and/or the consumable item itself. Instead, a user device is leveraged to input an authentication code for the virtual consumable item on which basis authentication of the virtual item occurs.

We claim:

1. A non-transitory computer-readable data storage medium storing program code executable by a user device to perform processing comprising:

inputting an authentication code for a virtual printing device consumable item;

transmitting the authentication code to a computing device for authentication of the virtual printing device consumable item; and upon successful authentication of the virtual printing device consumable item, associating the virtual printing device consumable item with a printing device to permit the printing device to print in accordance with the virtual printing device consumable item, wherein the virtual printing device consumable item has a virtual capacity of a specified number of pages, and the printing device is permitted to print the specified number of pages upon association of the virtual printing device consumable item with the printing device, and wherein the printing device subsequently prints as permitted by the virtual printing device consumable item.

2. The non-transitory computer-readable data storage medium of claim 1 wherein authentication of the virtual printing device consumable item provides for disintermediated authentication of a consumable item that the printing device uses to print.

3. The non-transitory computer-readable data storage medium of claim 1, wherein inputting the authentication code for the virtual printing device consumable item comprises:

optically scanning a graphical authentication code printed on an actual consumable item for the printing device or on packaging for the actual consumable item.

4. The non-transitory computer-readable data storage medium of claim 1, wherein associating the virtual printing device consumable item with the printing device comprises:

transmitting a request to the computing device to associate the virtual printing device consumable item with the printing device, the computing device responsively transmitting to the printing device a successful authentication validation code that permits the printing device to print in accordance with the virtual printing device consumable item.

5. The non-transitory computer-readable data storage medium of claim 1, wherein associating the virtual printing device consumable item with the printing device comprises:

transmitting a request to the computing device to associate the virtual printing device consumable item with the printing device;

responsively receiving from the computing device a successful authentication validation code that permits the printing device to print in accordance with the virtual printing device consumable item; and providing the successful authentication validation code to the printing device.

6. A method comprising:

receiving, by a computing device and from a user device, an authentication code for a virtual printing device consumable item;

authenticating, by the computing device, the virtual printing device consumable item using the authentication code; and upon successful authentication of the virtual printing device consumable item, associating the virtual printing device consumable item with a printing device to permit the printing device to print in accordance with the virtual printing device consumable item, wherein the printing device subsequently prints as permitted by the virtual printing device consumable item, and wherein authenticating the authentication code comprises verifying that the authentication code is a legitimate authentication code and that the virtual printing device consumable item has not been previously associated with any printing device.

7. The method of claim 6, wherein authentication of the virtual printing device consumable item provides for disintermediated authentication of a consumable item that the printing device uses to print.

8. The method of claim 6, wherein the virtual printing device consumable item has a virtual capacity of a specified number of pages, and wherein the printing device is permitted to print the specified number of pages upon association of the virtual printing device consumable item with the printing device.

9. The method of claim 6, wherein associating the virtual printing device consumable item with the printing device comprises:

receiving a request from the user device to associate the virtual printing device consumable item with the printing device; and responsively transmitting to the printing device a successful authentication validation code that permits the printing device to print in accordance with the virtual printing device consumable item.

10. The method of claim 6, wherein associating the virtual printing device consumable item with the printing device comprises:

receiving a request from the user device to associate the virtual printing device consumable item with the printing device; and responsively providing to the user device a successful authentication validation code that permits the printing device to print in accordance with the virtual printing device consumable item, the user device transmitting the successful authentication validation code to the printing device.

11. A printing device comprising:

print hardware to print using a consumable item;

a processor; and a memory storing program code executable by the processor to:

responsive to receiving a request to print a print job, determine whether the printing device has been permitted to print in accordance with a virtual printing device consumable item and that the virtual printing device consumable item has not been depleted;

responsive to determining that the printing device has been permitted to print in accordance with the virtual printing device consumable item and that the virtual printing device consumable item has not been depleted, print the print job using the consumable item; and responsive to determining that the printing device has not been permitted to print in accordance with the virtual printing device consumable item and/or that the virtual printing device consumable item has been depleted, do not print the print job using the consumable item, wherein the virtual printing device consumable item has a virtual capacity of a specified number of pages, and the printing device is permitted to print the specified number of pages upon association of the virtual printing device consumable item with the printing device.

12. The printing device of claim 11, wherein authentication of the virtual printing device consumable item provides for disintermediated authentication of the consumable item that the printing device uses to print.

\* \* \* \* \*